(12) United States Patent
Pettis et al.

(10) Patent No.: US 9,626,142 B2
(45) Date of Patent: Apr. 18, 2017

(54) AUTOMATED MODEL SELECTION

(71) Applicant: MakerBot Industries, LLC, Brooklyn, NY (US)

(72) Inventors: Nathaniel B. Pettis, Brooklyn, NY (US); Joseph Neal, Greenwich, CT (US)

(73) Assignee: MakerBot Industries, LLC, Brooklyn, NY (US)

( * ) Notice: Subject to any disclaimer, the term of this patent is extended or adjusted under 35 U.S.C. 154(b) by 927 days.

(21) Appl. No.: 13/958,701

(22) Filed: Aug. 5, 2013

(65) Prior Publication Data
US 2015/0036174 A1 Feb. 5, 2015

(51) Int. Cl.
*B33Y 10/00* (2015.01)
*B33Y 30/00* (2015.01)
*G06F 3/12* (2006.01)

(52) U.S. Cl.
CPC .......... *G06F 3/1288* (2013.01); *G06F 3/1204* (2013.01); *G06F 3/126* (2013.01); *G06F 3/1272* (2013.01)

(58) Field of Classification Search
None
See application file for complete search history.

(56) References Cited

U.S. PATENT DOCUMENTS

| | | | |
|---|---|---|---|
| 2002/0166220 A1* | 11/2002 | Imundo | B23P 6/00 29/402.09 |
| 2003/0105538 A1* | 6/2003 | Wooten | B64F 5/0009 700/90 |
| 2005/0025354 A1* | 2/2005 | Macy | G06T 7/0004 382/154 |
| 2005/0157919 A1* | 7/2005 | Di Santo | G06T 7/0004 382/141 |
| 2006/0293906 A1* | 12/2006 | Wilson | G05B 19/4183 705/304 |
| 2007/0084047 A1* | 4/2007 | Lange | B23P 6/005 29/889.1 |
| 2013/0090894 A1* | 4/2013 | Dikerman | G06Q 30/00 703/1 |
| 2014/0121820 A1* | 5/2014 | Das | G05B 19/4097 700/182 |
| 2014/0244433 A1* | 8/2014 | Cruz | G06Q 30/0633 705/26.8 |

* cited by examiner

*Primary Examiner* — Ronald Hartman, Jr.
(74) *Attorney, Agent, or Firm* — Strategic Patents, P.C.

(57) ABSTRACT

A server is configured to store a library of printable content and to select an item from the library in response to a user request. Instead of the user specifying a particular item, the server can automatically select from a number of different items. The server may automatically determine a printer type for the user and select a suitable, corresponding model for immediate fabrication by the printer.

32 Claims, 4 Drawing Sheets

AUTOMATED MODEL SELECTION

BACKGROUND

In general, computer representations of objects are shared in an abstract, descriptive form such as a computer-automated design (CAD) file or a stereolithography (STL) file. While these formats can provide a relatively compact and universal representation of a three-dimensional object, they generally require additional processing by a user in order to render machine-ready instructions for a three-dimensional printer. access. This process, sometimes referred to as "slicing" (in reference to the decomposition of the object into a sequence of two-dimensional slices) can be very processing intensive, and often requires user selection of a variety of parameters relating to layer thickness, infilling density, tool temperature, tool speeds, and so forth. Parameter optimization will depend in part of the type of three-dimensional printer being used. Further complicating this process, certain features of objects will generally render better using certain slicing parameters, and a successful print may require significant user experimentation. These challenges are exacerbated by the proliferation of three-dimensional printers and the increasing number of users with divergent hardware who are seeking printable content online.

Rather than experimentation with a wide range of three-dimensional models that might be available online, an owner or operator of a three-dimensional printer may simply wish to receive items of interest in a way that does not require extensive searching, and that does not require extensive experimentation with printer settings. There remains a need for tools that improve network access to printable content by users of three-dimensional printers.

SUMMARY

A server is configured to store a library of printable content and to select an item from the library in response to a user request. Instead of the user specifying a particular item, the server can automatically select from a number of different items. The server may automatically determine a printer type for the user and select a suitable, corresponding model for immediate fabrication by the printer.

BRIEF DESCRIPTION OF THE FIGURES

The invention and the following detailed description of certain embodiments thereof may be understood by reference to the following figures.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
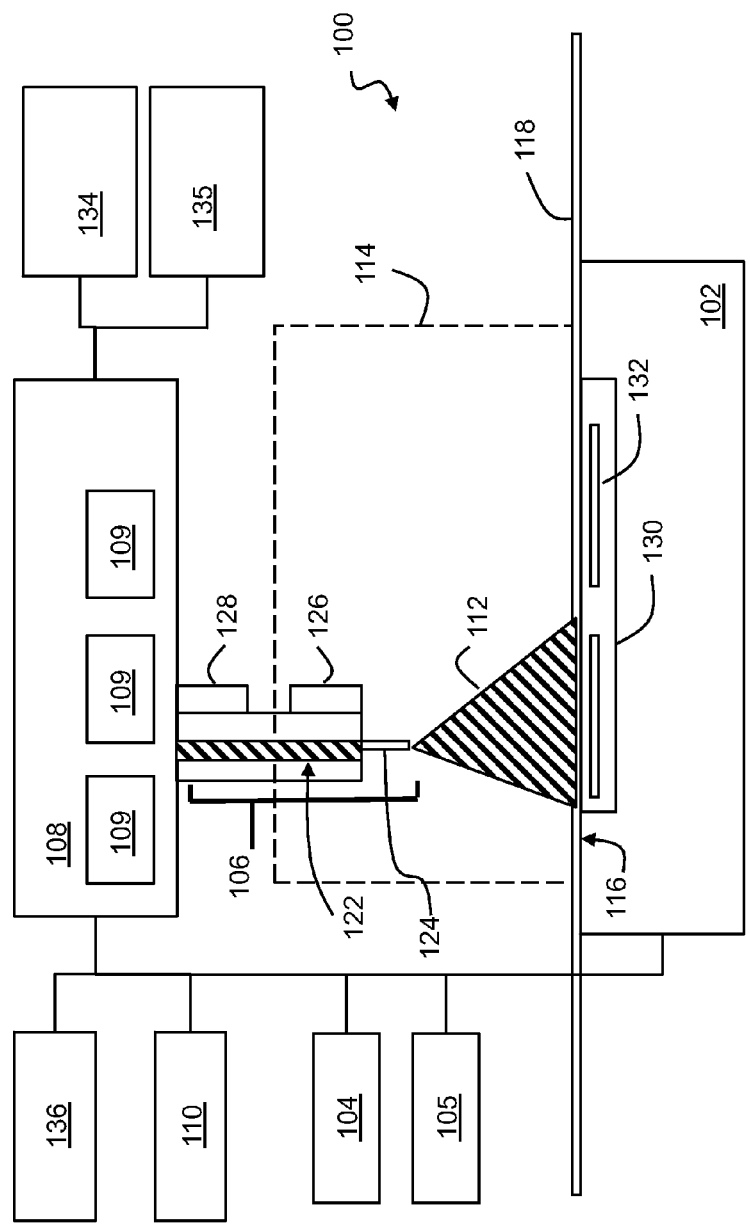
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling effect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 106. This arrangement may advantageously simplify design and improve accuracy by permitting an x-y positioning mechanism for the extruder 106 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

Figure 2:
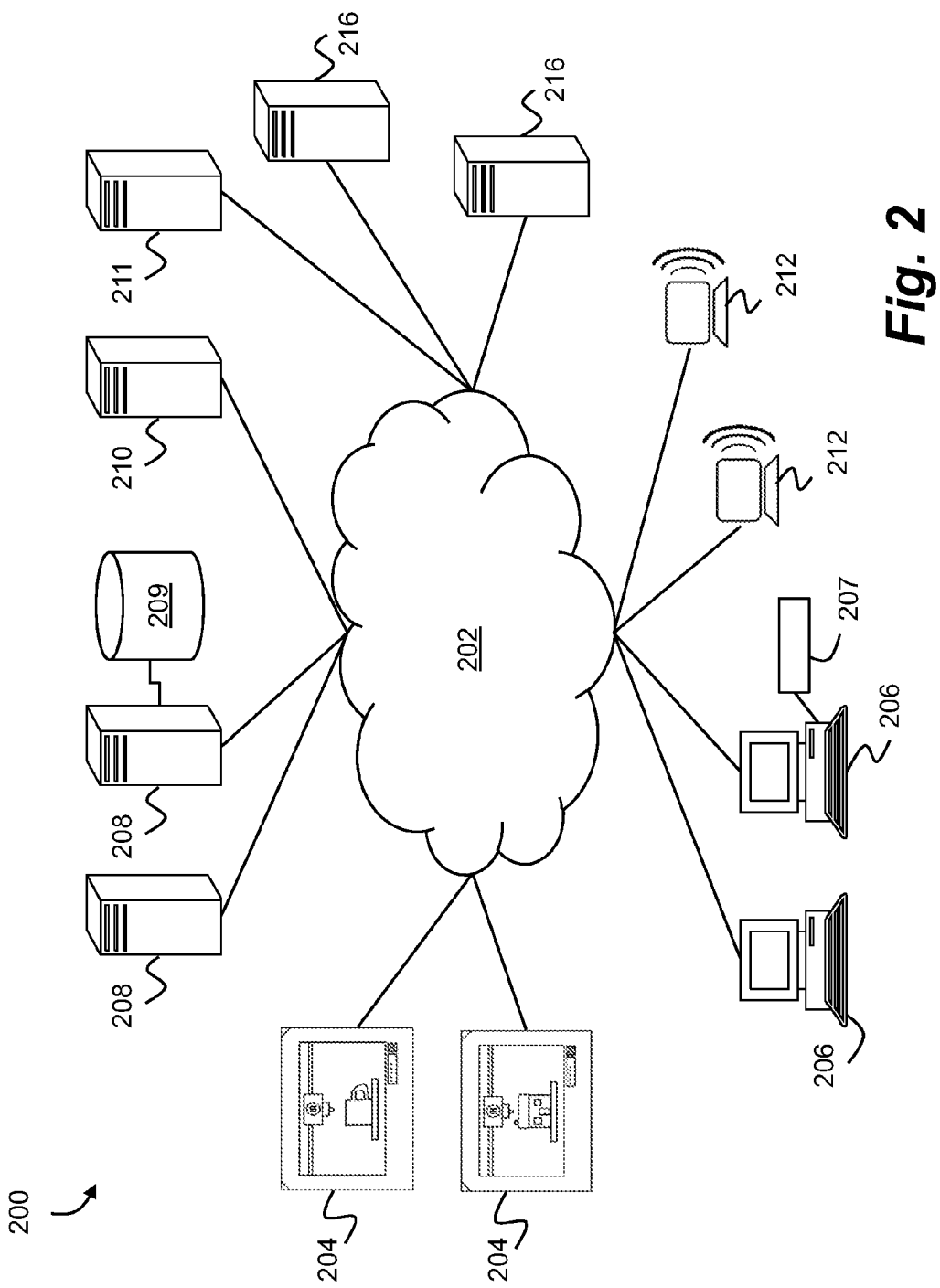
FIG. 2 depicts a networked three-dimensional printing environment.

FIG. 2 depicts a networked three-dimensional printing environment. In general, the environment 200 may include a data network 202 interconnecting a plurality of participating devices in a communicating relationship. The participating devices may, for example, include any number of three-dimensional printers 204 (also referred to interchangeably herein as "printers"), client devices 206, print servers 208, content sources 210, mobile devices 212, and other resources 216.

The data network 202 may be any network(s) or internetwork(s) suitable for communicating data and control information among participants in the environment 200. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMax-Advanced (IEEE 802.16m)) and/or other technologies, as well as any of a variety of corporate area or local area networks and other switches, routers, hubs, gateways, and the like that might be used to carry data among participants in the environment 200.

The three-dimensional printers 204 may be any computer-controlled devices for three-dimensional fabrication, including without limitation any of the three-dimensional printers or other fabrication or prototyping devices described above. In general, each such device may include a network interface comprising, e.g., a network interface card, which term is used broadly herein to include any hardware (along with software, firmware, or the like to control operation of same) suitable for establishing and maintaining wired and/or wireless communications. The network interface card may include without limitation wired Ethernet network interface cards ("NICs"), wireless 802.11 networking cards, wireless 802.11 USB devices, or other hardware for wireless local area networking. The network interface may also or instead include cellular network hardware, wide area wireless network hardware or any other hardware for centralized, ad hoc, peer-to-peer, or other radio communications that might be used to carry data. In another aspect, the network interface may include a serial or USB port to directly connect to a computing device such as a desktop computer that, in turn, provides more general network connectivity to the data network 202.

The printers 204 might be made to fabricate any object, practical or otherwise, that is amenable to fabrication according to each printer's capabilities. This may be a model of a house or a tea cup, as depicted, or any other object such as gears or other machine hardware, replications of scanned three-dimensional objects, or fanciful works of art.

Client devices 206 may be any devices within the environment 200 operated by users to initiate, manage, monitor, or otherwise interact with print jobs at the three-dimensional printers 204. This may include desktop computers, laptop computers, network computers, tablets, or any other computing device that can participate in the environment 200 as contemplated herein. Each client device 206 generally provides a user interface, which may include a graphical user interface, a text or command line interface, a voice-controlled interface, and/or a gesture-based interface to control operation of remote three-dimensional printers 204. The user interface may be maintained by a locally executing application on one of the client devices 206 that receives data and status information from, e.g., the printers 204 and print servers 208 concerning pending or executing print jobs. The user interface may create a suitable display on the client device 206 for user interaction. In other embodiments, the user interface may be remotely served and presented on one of the client devices 206, such as where a print server 208 or one of the three-dimensional printers 204 includes a web server that provides information through one or more web pages or the like that can be displayed within a web browser or similar client executing on one of the client devices 206. In one aspect, the user interface may include a voice controlled interface that receives spoken commands from a user and/or provides spoken feedback to the user.

A client device 206 may, for example include a removable memory device 207 such as a USB drive, memory stick, or the like, which may be used for example to transfer digital models of three-dimensional objects to printers 204.

The print servers 208 may include data storage, a network interface, and a processor and/or other processing circuitry. In the following description, where the functions or configuration of a print server 208 are described, this is intended to include corresponding functions or configuration (e.g., by programming) of a processor of the print server 208. In general, the print servers 208 (or processors thereof) may perform a variety of processing tasks related to management of networked printing. For example, the print servers 208 may manage print jobs received from one or more of the client devices 206, and provide related supporting functions such as content search and management. A print server 208 may also include a web server that provides web-based access by the client devices 206 to the capabilities of the print server 208. A print server 208 may also communicate periodically with three-dimensional printers 204 in order to obtain status information concerning, e.g., availability of printers and/or the status of particular print jobs, any of which may be subsequently presented to a user through the web server or any other suitable interface. A print server 208 may also maintain a list of available three-dimensional printers 204, and may automatically select one of the three-dimensional printers 204 for a user-submitted print job, or may permit a user to specify a single printer, or a group of preferred printers, for fabricating an object. Where the print server 208 selects the printer automatically, any number of criteria may be used such as geographical proximity, printing capabilities, current print queue, fees (if any) for use of a particular three-dimensional printer 204, and so forth. Where the user specifies criteria, this may similarly include any relevant aspects of three-dimensional printers 204, and may permit use of absolute criteria (e.g., filters) or preferences, which may be weighted preferences or unweighted preferences, any of which may be used by a print server 208 to allocate a print job to a suitable resource.

In one aspect, the print server 208 may be configured to support interactive voice control of one of the printers 204. For example, the print server 208 may be configured to receive a voice signal (e.g., in digitized audio form) from a microphone or other audio input of the printer 204, and to process the voice signal to extract relevant content such as a command for the printer. Where the command is recognized as a print command, the voice signal may be further processed to extract additional context or relevant details. For example, the voice signal may be processed to extract an object identifier that specifies an object for printing, e.g., by filename, file metadata, or semantic content. The voice signal may also be processed to extract a dimensional specification, such as a scale or absolute dimension for an object. The print server 208 may then generate suitable control signals for return to the printer 204 to cause the printer 204 to fabricate the object. Where an error or omission is detected, the print server 208 may return a request for clarification to the printer 204, which may render the request in spoken form through a speaker, or within a user interface of the printer 204 or an associated device.

Other user preferences may be usefully stored at the print server 208 to facilitate autonomous, unsupervised fabrication of content from content sources 210. For example, a print server 208 may store a user's preference on handling objects greater than a build volume of a printer. These preferences may control whether to resize the object, whether to break the object into multiple sub-objects for fabrication, and whether to transmit multiple sub-objects to a single printer or multiple printers. In addition, user preferences or requirements may be stored, such as multi-color printing capability, build material options and capabilities, and so forth. More generally, a print queue (which may be a printer-specific or user-specific queue, and which may be hosted at a printer 204, a server 208, or some combination of these) may be managed by a print server 208 according to one or more criteria from a remote user requesting a print job. The print server 208 may also store user preferences or criteria for filtering content, e.g., for automatic printing or other handling. While this is described below as a feature for autonomous operation of a printer (such as a printer that locally subscribes to a syndicated model source), any criteria that can be used to identify models of potential interest by explicit type (e.g., labeled in model metadata), implicit type (e.g., determined based on analysis of the model), source, and so forth, may be provided to the print server 208 and used to automatically direct new content to one or more user-specified ones of the three-dimensional printers 204.

In one aspect, the processor of the print server may be configured to store a plurality of print jobs submitted to the web server in a log and to provide an analysis of print activity based on the log. This may include any type of analysis that might be useful to participants in the environment 200. For example, the analysis may include tracking of the popularity of particular objects, or of particular content sources. The analysis may include tracking of which three-dimensional printers 204 are most popular or least popular, or related statistics such as the average backlog of pending print jobs at a number of the three-dimensional printers 204. The analysis may include success of a particular printer in fabricating a particular model or of a particular printer in completing print jobs generally. More generally, any statistics or data may be obtained, and any analysis may be performed, that might be useful to users (e.g., when requesting prints), content sources (e.g., when choosing new printable objects for publication), providers of fabrication resources (e.g., when setting fees), or network facilitators such as the print servers 208.

A print server 208 may also maintain a database 209 of content, along with an interface for users at client devices 206 to search the database 209 and request fabrication of objects in the database 209 using any of the three-dimensional printers 204. Thus in one aspect, a print server 208 (or any system including the print server 208) may include a database 209 of three-dimensional models, and the print server 208 may act as a server that provides a search engine for locating a particular three-dimensional model in the database 209. The search engine may be a text-based search engine using keyword text queries, plain language queries, and so forth. The search engine may also or instead include an image-based search engine configured to identify three-dimensional models similar to a two-dimensional or three-dimensional image provide by a user.

In another aspect, the printer server 208 may periodically search for suitable content at remote locations on the data network, which content may be retrieved to the database 209, or have its remote location (e.g., a URL or other network location identifier) stored in the database 209. In another aspect, the print server 208 may provide an interface for submission of objects from remote users, along with any suitable metadata such as a title, tags, creator information, descriptive narrative, pictures, recommended printer settings, and so forth. In one aspect, the database 209 may be manually curated according to any desired standards. In another aspect, printable objects in the database 209 may be manually or automatically annotated according to content type, popularity, editorial commentary, and so forth.

The print server 208 may more generally provide a variety of management functions. For example, the print server 204 may store a location of a predetermined alternative three-dimensional printer to execute a print job from a remote user in the event of a failure by the one of the plurality of three-dimensional printers 204. In another aspect, the print server 208 may maintain exclusive control over at least one of the plurality of three-dimensional printers 204, such that other users and/or print servers cannot control the printer. In another aspect, the print server 208 may submit a print job to a first available one of the plurality of three-dimensional printers 204.

In another aspect, a print server 208 may provide an interface for managing subscriptions to sources of content. This may include tools for searching existing subscriptions, locating or specifying new sources, subscribing to sources of content, and so forth. In one aspect, a print server 208 may manage subscriptions and automatically direct new content from these subscriptions to a three-dimensional printer 204 according to any user-specified criteria. Thus while it is contemplated that a three-dimensional printer 204 may autonomously subscribe to sources of content through a network interface and receive new content directly from such sources, it is also contemplated that this feature may be maintained through a remote resource such as a print server 208.

A print server 208 may maintain print queues for participating three-dimensional printers 204. This approach may advantageously alleviate backlogs at individual printers 204, which may have limited memory capacity for pending print jobs. More generally, a print server 208 may, by communicating with multiple three-dimensional printers 204, obtain a view of utilization of multiple networked resources that permits a more efficient allocation of print jobs than would be possible through simple point-to-point communications among users and printers. Print queues may also be published by a print server 208 so that users can view pending queues for a variety of different three-dimensional printers 204 prior to selecting a resource for a print job. In one aspect, the print queue may be published as a number of print jobs and size of print jobs so that a requester can evaluate likely delays. In another aspect, the print queue may be published as an estimated time until a newly submitted print job can be initiated.

In one aspect, the print queue of one of the print servers 208 may include one or more print jobs for one of the plurality of three-dimensional printers 204. The print queue may be stored locally at the one of the plurality of three-dimensional printers. In another aspect, the print queue may be allocated between the database 209 and a local memory of the three-dimensional printer 204. In another aspect, the print queue may be stored, for example, in the database 209 of the print server 208. As used here, the term 'print queue' is intended to include print data (e.g., the three-dimensional model or tool instructions to fabricate an object) for a number of print job (which may be arranged for presentation in order of expected execution), as well as any metadata concerning print jobs. Thus, a portion of the print queue such as the metadata (e.g., size, status, time to completion) may be usefully communicated to a print server 208 for sharing among users while another portion of the print queue such as the model data may be stored at a printer in preparation for execution of a print job.

Print queues may implement various user preferences on prioritization. For example, for a commercial enterprise, longer print jobs may be deferred for after normal hours of operation (e.g., after 5:00 p.m.), while shorter print jobs may be executed first if they can be completed before the end of a business day. In this manner, objects can be identified and fabricated from within the print queue in a manner that permits as many objects as possible to be fabricated before a predetermined closing time. Similarly, commercial providers of fabrication services may charge explicitly for prioritized fabrication, and implement this prioritization by prioritizing print queues in a corresponding fashion.

In another aspect, a print server 208 may provide a virtual workspace for a user. In this virtual workspace, a user may search local or remote databases of printable objects, save objects of interest (or links thereto), manage pending prints, specify preferences for receiving status updates (e.g., by electronic mail or SMS text), manage subscriptions to content, search for new subscription sources, and so forth. In one aspect, the virtual workspace may be, or may include, web-based design tools or a web-based design interface that permits a user to create and modify models. In one aspect, the virtual workspace may be deployed on the web, while permitting direct fabrication of a model developed within that environment on a user-specified one of the three-dimensional printers 204, thus enabling a web-based design environment that is directly coupled to one or more fabrication resources.

The content sources 210 may include any sources of content for fabrication with a three-dimensional printer 204. This may, for example, include databases of objects accessible through a web interface or application programming interface. This may also or instead include individual desktop computers or the like configured as a server for hosted access, or configured to operate as a peer in a peer-to-peer network. This may also or instead include content subscription services, which may be made available in an unrestricted fashion, or may be made available on a paid subscription basis, or on an authenticated basis based upon some other relationship (e.g., purchase of a related product or a ticket to an event). It will be readily appreciated that any number of content providers may serve as content sources 210 as contemplated herein. By way of non-limiting example, the content sources 210 may include destinations such as amusement parks, museums, theaters, performance venues, or the like, any of which may provide content related to users who purchase tickets. The content sources 210 may include manufacturers such as automobile, computer, consumer electronics, or home appliance manufacturers, any of which may provide content related to upgrades, maintenance, repair, or other support of existing products that have been purchased. The content sources 210 may include artists or other creative enterprises that sell various works of interest. The content sources 210 may include engineering or architectural firms that provide marketing or advertising pieces to existing or prospective customers. The content sources 210 may include marketing or advertising firms that provide promotional items for clients. More generally, the content sources 210 may be any individual or enterprise that provides single or serial objects for fabrication by the three-dimensional printers 204 described herein.

One or more web servers 211 may provide web-based access to and from any of the other participants in the environment 200. While depicted as a separate network entity, it will be readily appreciated that a web server 211 may be logically or physically associated with one of the other devices described herein, and may, for example, provide a user interface for web access to one of the three-dimensional printers 204, one of the print servers 208 (or databases 209 coupled thereto), one of the content sources 210, or any of the other resources 216 described below in a manner that permits user interaction through the data network 202, e.g., from a client device 206 or mobile device 212.

The mobile devices 212 may be any form of mobile device, such as any wireless, battery-powered device, that might be used to interact with the networked printing environment 200. The mobile devices 212 may, for example, include laptop computers, tablets, thin client network computers, portable digital assistants, messaging devices, cellular phones, smart phones, portable media or entertainment devices, and so forth. In general, mobile devices 212 may be operated by users for a variety of user-oriented functions such as to locate printable objects, to submit objects for printing, to monitor a personally owned printer, and/or to monitor a pending print job. A mobile device 212 may include location awareness technology such as Global Positioning System ("GPS"), which may obtain information that can be usefully integrated into a printing operation in a variety of ways. For example, a user may select an object for printing and submit a model of the object to a print server, such as any of the print servers described above. The print server may determine a location of the mobile device 212 initiating the print job and locate a closest printer for fabrication of the object.

In another aspect, a printing function may be location-based, using the GPS input (or cellular network triangulation, proximity detection, or any other suitable location detection techniques). For example, a user may be authorized to print a model only when the user is near a location (e.g., within a geo-fenced area or otherwise proximal to a location), or only after a user has visited a location. Thus a user may be provided with printable content based upon locations that the user has visited, or while within a certain venue such as an amusement park, museum, theater, sports arena, hotel, or the like. Similarly, a matrix barcode such as a QR code may be employed for localization.

The other resources 216 may include any other software or hardware resources that may be usefully employed in networked printing applications as contemplated herein. For example, the other resources 216 may include payment processing servers or platforms used to authorize payment for content subscriptions, content purchases, or printing resources. As another example, the other resources 216 may include social networking platforms that may be used, e.g., to share three-dimensional models and/or fabrication results according to a user's social graph. In another aspect, the other resources 216 may include certificate servers or other security resources for third party verification of identity, encryption or decryption of three-dimensional models, and so forth. In another aspect, the other resources 216 may include online tools for three-dimensional design or modeling, as well as databases of objects, surface textures, build supplies, and so forth. In another aspect, the other resources 216 may include a desktop computer or the like co-located (e.g., on the same local area network with, or directly coupled to through a serial or USB cable) with one of the three-dimensional printers 204. In this case, the other resource 216 may provide supplemental functions for the three-dimensional printer 204 in a networked printing context such as maintaining a print queue or operating a web server for remote interaction with the three-dimensional printer 204. Other resources 216 also include supplemental resources such as three-dimensional scanners, cameras, and post-processing/finishing machines or resources. More generally, any resource that might be usefully integrated into a networked printing environment may be one of the resources 216 as contemplated herein.

It will be readily appreciated that the various components of the networked printing environment 200 described above may be arranged and configured to support networked printing in a variety of ways. For example, in one aspect there is disclosed herein a networked computer with a print server and a web interface to support networked three-dimensional printing. This device may include a print server, a database, and a web server as discussed above. The print server may be coupled through a data network to a plurality of three-dimensional printers and configured to receive status information from one or more sensors for each one of the plurality of three-dimensional printers. The print server may be further configured to manage a print queue for each one of the plurality of three-dimensional printers. The database may be coupled in a communicating relationship with the print server and configured to store print queue data and status information for each one of the plurality of three-dimensional printers. The web server may be configured to provide a user interface over the data network to a remote user, the user interface adapted to present the status information and the print queue data for one or more of the plurality of three-dimensional printers to the user and the user interface adapted to receive a print job from the remote user for one of the plurality of three-dimensional printers.

The three-dimensional printer 204 described above may be configured to autonomously subscribe to syndicated content sources and periodically receive and print objects from those sources. Thus in one aspect there is disclosed herein a device including any of the three-dimensional printers described above; a network interface; and a processor (which may without limitation include the controller for the printer). The processor may be configured to subscribe to a plurality of sources of content (such as the content sources 210 described above) selected by a user for fabrication by the three-dimensional printer through the network interface. The processor may be further configured to receive one or more three-dimensional models from the plurality of content sources 210, and to select one of the one or more three-dimensional models for fabrication by the three-dimensional printer 204 according to a user preference for prioritization. The user preference may, for example, preferentially prioritize particular content sources 210, or particular types of content (e.g., tools, games, artwork, upgrade parts, or content related to a particular interest of the user).

The memory of a three-dimensional printer 204 may be configured to store a queue of one or more additional three-dimensional models not selected for immediate fabrication. The processor may be programmed to periodically re-order or otherwise alter the queue according to predetermined criteria or manual user input. For example, the processor may be configured to evaluate a new three-dimensional model based upon a user preference for prioritization, and to place the new three-dimensional model at a corresponding position in the queue. The processor may also or instead be configured to retrieve content from one of the content sources 210 by providing authorization credentials for the user, which may be stored at the three-dimensional printer or otherwise accessible for presentation to the content source 210. The processor may be configured to retrieve content from at least one of the plurality of content sources 210 by authorizing a payment from the user to a content provider. The processor may be configured to search a second group of sources of content (such as any of the content sources 210 described above) according to one or more search criteria provide by a user. This may also or instead include demographic information for the user, contextual information for the user, or any other implicit or explicit user information.

In another aspect, there is disclosed herein a system for managing subscriptions to three-dimensional content sources such as any of the content sources 210 described above. The system may include a web server configured to provide a user interface over a data network, which user interface is adapted to receive user preferences from a user including a subscription to a plurality of sources of a plurality of three-dimensional models, a prioritization of content from the plurality of sources, and an identification of one or more fabrication resources coupled to the data network and suitable for fabricating objects from the plurality of three-dimensional models. The system may also include a database to store the user preferences, and to receive and store the plurality of three-dimensional models as they are issued by the plurality of sources. The system may include a processor (e.g., of a print server 208, or alternatively of a client device 206 interacting with the print server 208) configured to select one of the plurality of three-dimensional models for fabrication based upon the prioritization. The system may include a print server configured to communicate with the one or more fabrication resources through the data network, to determine an availability of the one or more fabrication resources, and to transmit the selected one of the plurality of three-dimensional models to one of the one or more fabrication resources.

In another aspect, there is disclosed herein a network of three-dimensional printing resources comprising a plurality of three-dimensional printers, each one of the plurality of three-dimensional printers including a network interface; a server configured to manage execution of a plurality of print jobs by the plurality of three-dimensional printers; and a data network that couples the server and the plurality of three-dimensional printers in a communicating relationship.

In general as described above, the server may include a web-based user interface configured for a user to submit a new print job to the server and to monitor progress of the new print job. The web-based user interface may permit video monitoring of each one of the plurality of three-dimensional printers, or otherwise provide information useful to a remote user including image-based, simulation-based, textual-based or other information concerning status of a current print. The web-based user interface may include voice input and/or output for network-based voice control of a printer.

The fabrication resources may, for example, include any of the three-dimensional printers 204 described above. One or more of the fabrication resources may be a private fabrication resource secured with a credential-based access system. The user may provide, as a user preference and prior to use of the private fabrication resource, credentials for accessing the private fabrication resource. In another aspect, the one or more fabrication resources may include a commercial fabrication resource. In this case the user may provide an authorization to pay for use of the commercial fabrication resource in the form of a user preference prior to use of the commercial fabrication resource.

Many current three-dimensional printers require significant manufacturing time to fabricate an object. At the same time, certain printers may include a tool or system to enable multiple, sequential object prints without human supervision or intervention, such as a conveyor belt. In this context, prioritizing content may be particularly important to prevent crowding out of limited fabrication resources with low priority content that arrives periodically for autonomous fabrication. As a significant advantage, the systems and methods described herein permit prioritization using a variety of user-specified criteria, and permit use of multiple fabrication resources in appropriate circumstances. Thus prioritizing content as contemplated herein may include any useful form of prioritization. For example, this may include prioritizing the content according to source. The content sources 210 may have an explicit type that specifies the nature of the source (e.g., commercial or paid content, promotional content, product support content, non-commercial) or the type of content provided (e.g., automotive, consumer electronics, radio control hobbyist, contest prizes, and so forth). Prioritizing content may include prioritizing the content according to this type. The three-dimensional models themselves may also or instead include a type (e.g., tool, game, home, art, jewelry, replacement part, upgrade part, etc.) or any other metadata, and prioritizing the content may includes prioritizing the content according to this type and/or metadata.

In one aspect, the processor may be configured to select two or more of the plurality of three-dimensional models for concurrent fabrication by two or more of the plurality of fabrication resources based upon the prioritization when a priority of the two or more of the plurality of three-dimensional models exceeds a predetermined threshold. That is, where particular models individually have a priority above the predetermined threshold, multiple fabrication resources may be located and employed to fabricate these models concurrently. The predetermined threshold may be evaluated for each model individually, or for all of the models collectively such as on an aggregate or average basis.

In one aspect, the processor may be configured to adjust prioritization based upon a history of fabrication when a number of objects fabricated from one of the plurality of sources exceeds a predetermined threshold. Thus, for example, a user may limit the number of objects fabricated from a particular source, giving subsequent priority to content from other sources regardless of an objectively determined priority for a new object from the particular source. This prevents a single source from overwhelming a single fabrication resource, such as a personal three-dimensional printer operated by the user, in a manner that crowds out other content from other sources of possible interest. At the same time, this may enable content sources 210 to publish on any convenient schedule, without regard to whether and how subscribers will be able to fabricate objects.

In another aspect, the processor may be configured to identify one or more additional sources of content based upon a similarity to one of the plurality of sources of content. For example, where a content source 210 is an automotive manufacturer, the processor may perform a search for other automotive manufactures, related parts suppliers, mechanics, and so forth. The processor may also or instead be configured to identify one or more additional sources of content based upon a social graph of the user. This may, for example, include analyzing a social graph of relationships from the user to identify groups with common interests, shared professions, a shared history of schools or places of employment, or a common current or previous residence location, any of which may be used to locate other sources of content that may be of interest to the user.

Figure 3:
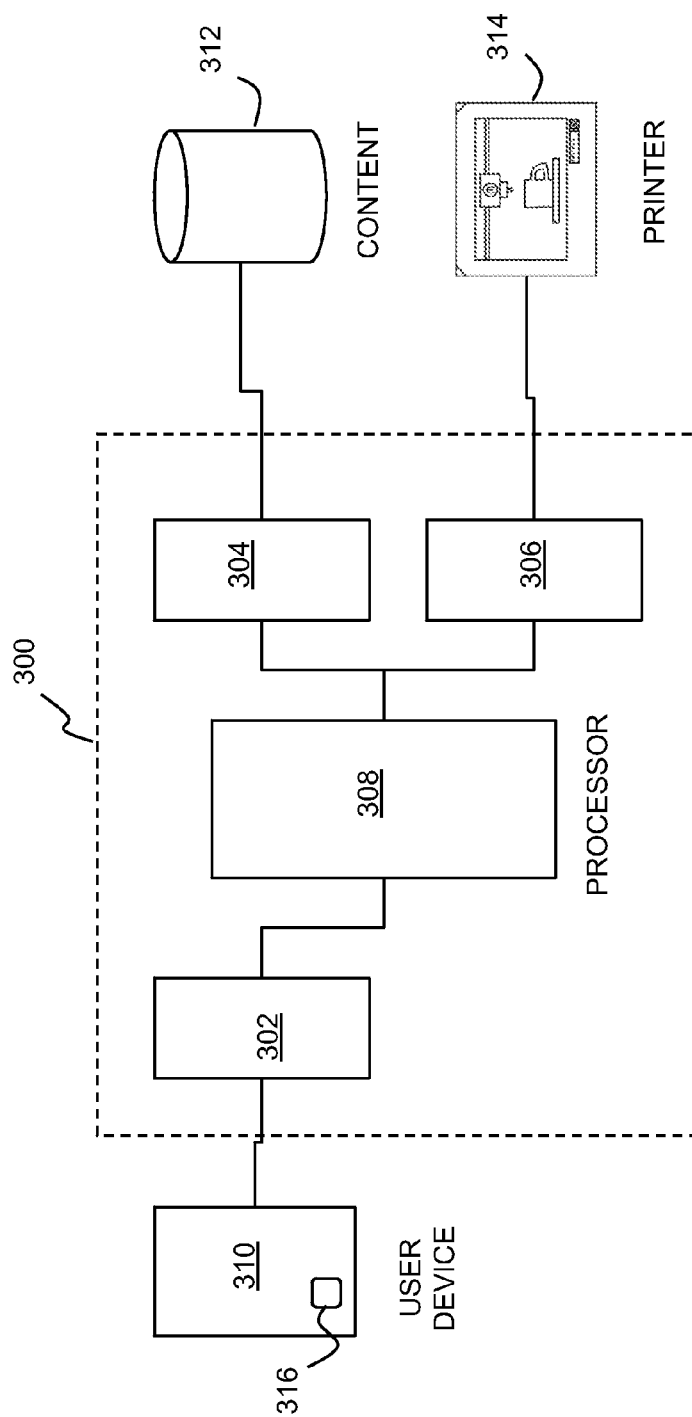
FIG. 3 shows a system for automatically selecting printable content.

FIG. 3 shows a system for automatically selecting printable content. The system 300 may include a user interface 302, a data interface 304, a printer interface 306, and processing circuitry 308. In general operation, the processing circuitry 308 operates to receive user input (in particular, user input that does not specify a printable object), selecting printable content from a content library 312, and transmitting the printable content to a printer 314.

The user interface 302 may be any interface, including hardware, software, and the like suitable for receiving a user input for the processing circuitry 308. The user interface 302 may, for example, include a communications interface for receiving input from a local or remote device, such as the user device 310. In another aspect, the user interface 302 may be embedded in the user device 310 and provide to a user through a touch screen, keypad, mouse, and the like of the user device 310. In another aspect, the user interface 302 may be a combination of such components, such as a web-based user interface provided from a remote server and the user device 310 may act as a client coupled through a data network to the remote server. In one aspect, the user interface 302 may include a web interface provided by a web server or a print server. In another aspect, the user interface may include a graphical user interface rendered on a computing device locally coupled to the three-dimensional printer. The user interface 302 may also include any combination of the foregoing.

The user device 310 may be a computing device such as a laptop computer, desktop computer, tablet, smart phone, or other computing device that can be operated by a user to provide input to the user interface 302. In another aspect, the user device 310 may be a three-dimensional printer, and the user interface 302 may include a display, buttons, or other physical user interface element on the three-dimensional printer that the user can interact with to receive automatic selections of content for the three-dimensional printer from the content library 312.

The user input may be any suitable interaction received through any of the user interface described above. For example, the user input may be a single user interaction such as a single mouse click within a local program executing on a computing device, or a single mouse click of a button in a page rendered in a web browser. In another aspect, where the user device is a three-dimensional printer, the single user interaction may be a push of a button on the printer. In one aspect, a printer may include a button dedicated to automatically retrieving such content, which may be suitably labeled with any appropriate text such as "print something" or "surprise me," or a similarly informative symbol or graphic.

It will be understood that each such user input implies somewhat different handling. For example, where the user input is received through a button on a printer, the printer may forward the user input to a locally coupled computer or, if the printer includes a network interface, to a remote server for processing. Similarly, where the user input is received on a computing device, the input may be received through an application locally executing on the computing device, which may be forwarded to a remote processing resource that provides the processing circuitry to select content, or the user input may be received through a control in a page that is rendered on a web browser. The design of such interfaces is well within the ordinary skill in the art, and details of the implementation or not discussed here.

The data interface 304 may include any suitable programming interface and/or local or remote communications interface for communicating with the content library 312 and accessing printable content stored in the content library. The content library 312 may be any predetermined library of printable three-dimensional content stored, e.g., in a database or other data structure(s) for access through the data interface 304. The predetermined library of printable three-dimensional content may be provided to the content library 312 in a variety of ways. In one aspect, the content library 312 may be a manually curated library of printable items that may be updated by a curator on a daily, weekly, or other periodic basis. In another aspect, the content library may be automatically updated based on some predetermined algorithm, such as by retrieving the top five most popular downloads of printable content on, e.g., a print server or other source of printable content. In another aspect, the content library 312 may be dynamically created in response to the user input. Thus for example, when the user input is received, the system 300 may perform a search of various resources using any suitable search criteria and may assemble a number of search results as the predetermined library of printable content. From this library, a particular item may be selected using any criteria, rules, or the like that might be applied by the processing circuitry 308. While the processing circuitry 308 may thus be programmed or otherwise configured to select a single item of printable content from the content library 312 for response to the user input, the system 300 may also or instead be configured to place a single item of printable content in the content library 312 so that any user request will deterministically retrieve the selected, single item. More generally, any technique for populating the content library 312 with one or more items of printable content, and for subsequently selecting one of the items of printable content, may be used in the system 300 to automatically select printable content in response to user requests as contemplated herein.

The printer interface 306 may be any programming interface and/or local or remote communications interface configured to connect to and communicate with a printer 314, such as any of the printers described above.

The processing circuitry 308 generally coordinates operation of the user interface 302, data interface 304, and printer interface 306 to automatically select printable content in response to user requests, and transmit the printable content to the printer 314 for fabrication.

In one aspect, the processing circuitry 308, which may be a microprocessor, microcontroller, or any other suitable hardware and/or software, may be configured to receive user input from a user through the user interface 302 that does not specify an item in the library of printable three-dimensional content. That is, a user may provide a general request, e.g., through a button 316 on a printer or in a web browser, to print content. The user interface 302 may parameterize the request in any suitable human-readable form, e.g., by presenting a button that says "print me something popular," or simply "print me something." In response to receiving such a request, the processing circuitry 308 may select an item of printable three-dimensional content from the predetermined library of printable three-dimensional content in the content library 312 according to one or more criteria for the user and to transmit the item of printable three-dimensional content to the three-dimensional printer 314 through the printer interface 306 for fabrication.

The processing circuitry 308 may include a local processor executing on a three-dimensional printer, a processor executing on a computing device locally connected to the three-dimensional printer, a processor executing on a web server coupled in a communicating relationship with a client device operated by the user, or any combination of these. Thus, while FIG. 3 depicts a system 300 external to a user device 310, a content library 312, and a three-dimensional printer 314, the system 300 may in various permutations employ processing resources, data storage, and user interface components of any or all of these elements, or may reside in an entirely separate device independent from these devices. As such, the functionality of automated content selection and fabrication may be supported in a variety of different hardware and software configurations, and the depiction of discrete components provided in FIG. 3 should be understood only as an illustrative example.

The processing circuitry 308 may employ any of a variety of algorithmic techniques to select an item from the content library 312 for fabrication. For example, the processing circuitry 308 may be programmed or otherwise configured to randomly select an item from the predetermined library of three-dimensional content using any suitable randomization process. Where a web server is used to support this process and provide the processing circuitry 308, the web server may include a print server that manages a plurality of three-dimensional printers, such as any of the print servers described above. The print server may also manage transmittal of the item to a suitable three-dimensional printer such as the three-dimensional printer 314.

Figure 4:
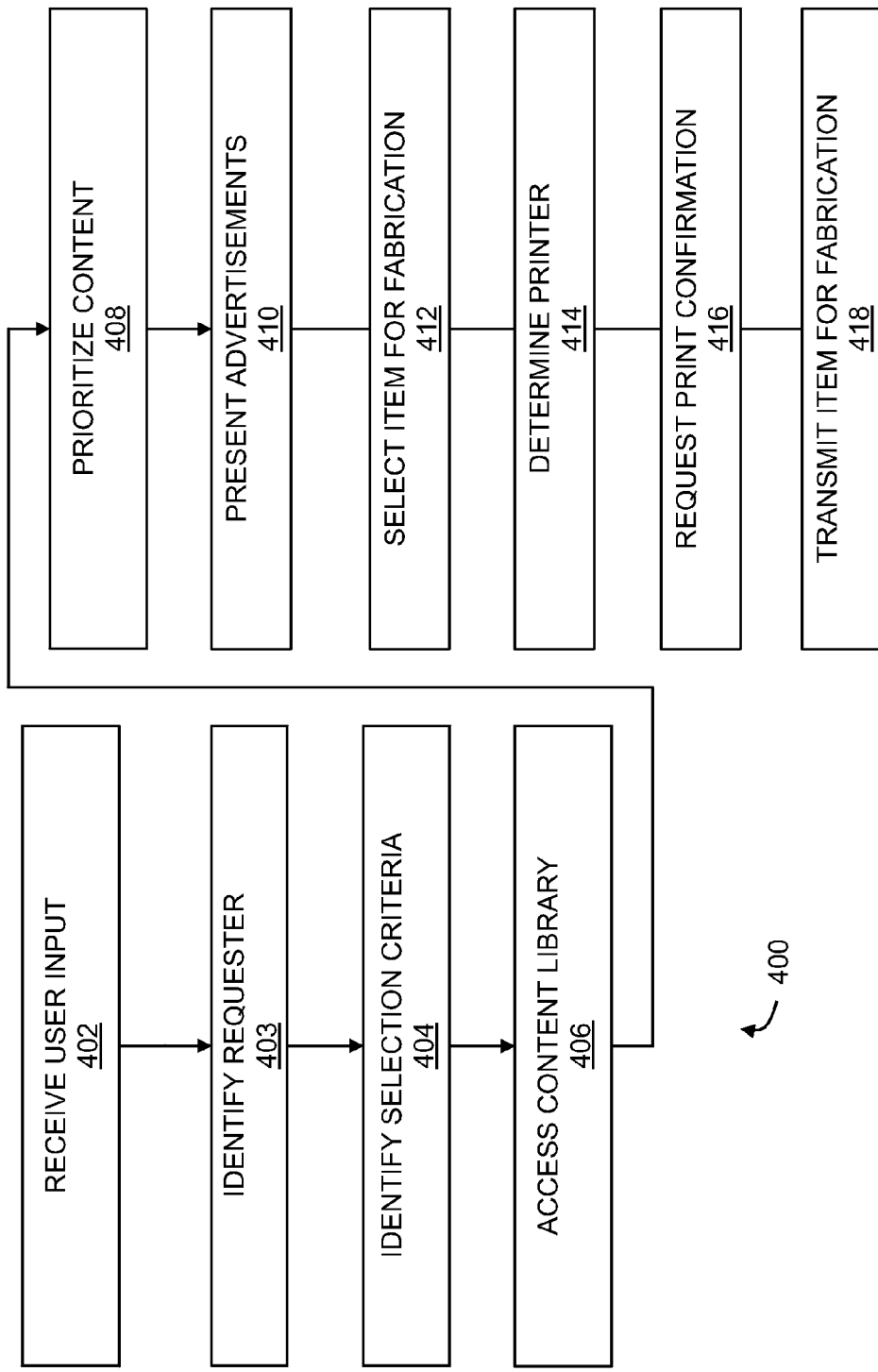
FIG. 4 shows a process for automatically selecting printable content.

FIG. 4 shows a process for automatically selecting printable content. The process 400 may be implemented, for example, in the processing circuitry described above.

As shown in step 402, the process 400 may begin with receiving a user input, e.g., through a user interface. In general, it is contemplated that the user input does not specify a printable item, and that the process 400 would provide an automatic selection of content for the user that initiated the user input 402. As noted above, the user input may be an explicit user initiation of an automatic selection process using any suitable interface control as discussed above. In another aspect, the user input may be an implicit or indirect user input. For example, a user may be presented with a game of chance using dice, a roulette wheel, cards, dominos, guessing, or the like. The user input may be an input to or interaction with the game of chance, with the result of the game of chance being a reward of a printable content item. Stated differently, the item automatically selected by the process may be selected based upon a result of the game of chance, with the result determining which (if any) of a number of items in the content library is selected as a reward.

As shown in step 403, the process 400 may include identifying a requester. This step is optional. An automatic selection of printable content may be readily made without identifying a particular user (i.e., the requester) who is requesting the item. At the same time, determining the user's identity permits numerous enhancements to an automatic selection process such as employing profile information for the user to provide more relevant selections and to ensure that the same item of printable content is not provided multiple times in response to multiple requests. Identifying the user also permits an informed selection of an appropriate three-dimensional printer to receive the printable item where, for example, the user does not specify a three-dimensional printer or where the user does not have a locally available printer to receive the selected item. Similarly, where the requester is associated with a particular type of printer, either by a server that the user is accessing (e.g., through account information for the user) or through an explicit identification of printer type provided by the user, an item can be selected that is optimized for the printer type. This may, for example, include selection of a different item according to the printer type, or selecting a machine-ready version of the item for the printer type. A machine-ready version may include machine or tool instructions such as g-code that can be directly executed by a printer of the printer type. Thus for example, where multiple printer types are in use, a particular instance of an item—a machine-ready version of the item—can be automatically selected.

As shown in step 404, the process 400 may include identifying one or more criteria for automatically selecting an item of printable content. This step may be optionally omitted where, for example, a simple random choice is provided. However, the use of various criteria permits an automated selection of content that is more likely of interest to a particular user. Thus in one aspect, these selection criteria may be used to improve the likelihood that an automatically selected item will be of interest to a user. Any user profile, social networking, or other criteria may be used to gauge and select based on expected user interest.

In another aspect, the one or more criteria may include a fabrication history for the user. These criteria may be used to ensure that an automatic selection does not repeat an item already fabricated by the user, or to select an item based on similarity to previously fabricated items. Thus the one or more criteria may include an indication of whether an item preliminarily selected for fabrication has been previously fabricated by the user, in which case an alternative item may be selected from the content library.

In another aspect, the one or more criteria may include a type of a three-dimensional printer associated with the user where, as noted above a particular item best suited to that type or a machine-ready version of the item can be identified. The criteria may also include default settings for a type (e.g., print resolution, print speed, layer thickness, etc.), changes to default settings by a user, a firmware version, or any other information characterizing a three-dimensional printer. More generally, the selection criteria may be chosen and applied to select an item that can reliably be fabricated on a particular type of fabrication hardware associated with the user.

In another aspect, the one or more criteria may include criteria obtained from a user profile for the user. A user profile, where available, may contain various pieces of information that might be relevant to an automated content selection. For example, the user profile may be based upon a search history for the user, a printing history for the user, or a viewing history of printable objects for the user. In another aspect, the one or more criteria may include criteria obtained from a social network for the user. This latter source of criteria may be particularly useful where a user account for the user at a print server is linked to another account for the user on a social networking platform or the like. In another aspect, the one or more criteria may include an explicit user preference provided by the user and stored, e.g., in a user account, user profile, website cookie, or any other location. Explicit user preferences may, for example, include a designation of subject matter of interest to the user such as hobbies, professional activities, affiliations, and so forth. Other subject matter may relate to user interests such as favorite sports teams, television programs, actors, and so forth. Explicit user preferences may also or instead include technical preferences such as a size of printable objects, a build material, and so forth.

As shown in step 406, the process 400 may include accessing a content library containing a predetermined library of printable content.

As shown in step 408, the process 400 may include prioritizing items of printable content that are available in the content library. For example, items may be prioritized according to popularity, sponsorship from an advertiser, creation date, or any other suitable factor(s), so that one item can be preferentially selected over other items.

As shown in step 410, the process 400 may include presenting advertisements. This may simply include presenting advertisements for display to the user based on, e.g., sponsorship of downloadable content or any other criteria. In one aspect, a user may be presented with an option to view an advertisement in a user interface or other display as a prerequisite to receiving a reward of a particular item of printable content. Thus in one aspect the system described above may include processing circuitry configured to present a user with an option to view an advertisement and to receive a particular item from the predetermined library as a reward for viewing the advertisement. The advertisement may be presented, e.g., on a user interface of a three-dimensional printer or a display of a computer associated with the user.

As shown in step 412, the process 400 may include selecting an item for prioritization. This may include a specific item based on any of the above steps. That is, the item may be selected based on the identity of the user as described in step 403, based on the selection criteria described in step 404, based on the prioritization described in step 408, or based on interaction with advertisements as described in step 410. The selection may also be randomized selection of an item from the content library, or a selection based on any other rules, criteria, or the like.

As shown in step 414, the process 400 may include determining a printer. This may for example include identifying a printer locally coupled to a client device, or selecting a printer identified in a user profile for the user. If no printer is associated with the user, this may include selecting one or more printing resources, e.g., from a print server or the like, that might be suitable for the user based on location or any other criteria, and presenting the selected printer to the user so that the user can accept or refuse the selected printer. In another aspect, the user may be requested to identify a printer. As such, the processing circuitry described above may be configured to receive a user selection of a particular three-dimensional printer to fabricated the item selected using the automatic selection process described above.

As shown in step 416, the process 400 may include requesting a print confirmation. After selection of an item to print as described above and determining a printer for fabricate the item, a confirmation request may be transmitted to the user on any associated device. Thus in one aspect, the system described above may include processing circuitry configured to receive a user confirmation prior to fabricating an automatically selected item.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system comprising:
   a user interface configured to receive a user input;
   a data interface configured to connect to a predetermined library of printable three-dimensional content;
   a printer interface configured to connect to a three-dimensional printer; and
   processing circuitry, the processing circuitry configured to receive the user input from a user that does not specify an item in the library of printable three-dimensional content and in response to the user input, to select an item of printable three-dimensional content from the predetermined library of printable three-dimensional content according to one or more criteria for the user and to transmit the item of printable three-dimensional content to the three-dimensional printer through the printer interface for fabrication.

2. The system of claim 1 wherein the user input is a single user interaction.

3. The system of claim 2 wherein the single user interaction is a single mouse click.

4. The system of claim 1 wherein the predetermined library of printable three-dimensional content includes a manually curated library of printable items.

5. The system of claim 1 wherein the processing circuitry is programmed to randomly select the item from the predetermined library.

6. The system of claim 1 wherein the predetermined library is created in response to the user input.

7. The system of claim 1 wherein the processing circuitry includes a local processor executing on the three-dimensional printer.

8. The system of claim 1 wherein the processing circuitry includes a processor executing on a computing device locally connected to the three-dimensional printer.

9. The system of claim 1 wherein the processing circuitry includes a processor executing on a web server coupled in a communicating relationship with a client device operated by the user.

10. The system of claim 9 wherein the web server includes a print server that manages a plurality of three-dimensional printers.

11. The system of claim 10 wherein the user interaction includes an activation of a button in the user interface by the user.

12. The system of claim 1 wherein the user interface includes a physical user interface of the three-dimensional printer.

13. The system of claim 1 wherein the user interface includes a web interface provided by a web server.

14. The system of claim 1 wherein the user interface includes a graphical user interface rendered on a computing device locally coupled to the three-dimensional printer.

15. The system of claim 1 wherein the one or more criteria includes a type of the three-dimensional printer.

16. The system of claim 1 wherein the one or more criteria includes a fabrication history for the user.

17. The system of claim 16 wherein the one or more criteria includes an indication of whether an item preliminarily selected for fabrication has been previously fabricated by the user, wherein an alternative item is selected when the item preliminarily selected for fabrication has been previously fabricated by the user.

18. The system of claim 1 wherein the one or more criteria includes criteria obtained from a user profile for the user.

19. The system of claim 18 wherein the user profile is based upon one or more of a search history for the user, a printing history for the user, and a viewing history of printable objects for the user.

20. The system of claim 1 wherein the one or more criteria includes criteria obtained from a social network for the user.

21. The system of claim 1 wherein the one or more criteria includes an explicit user preference.

22. The system of claim 21 wherein explicit the user preference relates to subject matter of interest to the user.

23. The system of claim 21 wherein the explicit user preference relates to a size of printable objects.

24. The system of claim 1 wherein the item is further selected according to a prioritization for each item in the predetermined library of printable three-dimensional content.

25. The system of claim 24 wherein each item is prioritized according to popularity.

26. The system of claim 24 wherein each item is prioritized according to sponsorship from an advertiser.

27. The system of claim 1 further comprising processing circuitry configured to present the user with an option to view an advertisement and receive a particular item from the predetermined library as a reward for viewing the advertisement.

28. The system of claim 27 wherein the advertisement is presented on a user interface of the three-dimensional printer.

29. The system of claim 27 wherein the advertisement is presented on a display of a computer associated with the user.

30. The system of claim 1 wherein the processing circuitry is further configured to receive a user confirmation prior to fabricating the item.

31. The system of claim 1 wherein the processing circuitry is further configured to receive a user selection of a particular three-dimensional printer to fabricate the item.

32. The system of claim 1 wherein the user input is an input to a game of chance and wherein the item is selected based upon a result of the game of chance.

* * * * *